(12) United States Patent
Hooton et al.

(10) Patent No.: US 9,179,055 B2
(45) Date of Patent: Nov. 3, 2015

(54) CAMERA RELATED FEATURES OF A MOBILE PHONE OR COMPUTING DEVICE (71) Applicant: Apple Inc., Cupertino, CA (US)

(72) Inventors: Lee E. Hooton, Cupertino, CA (US); Douglas S. Brodie, Los Gatos, CA (US); Matthew D. Hill, Santa Clara, CA (US); Nicholas G. Merz, San Francisco, CA (US); Scott A. Myers, Saratoga, CA (US); Terence N. Tam, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 14 days.

(21) Appl. No.: 14/255,893

(22) Filed: Apr. 17, 2014

(65) Prior Publication Data

US 2015/0062419 A1 Mar. 5, 2015

Related U.S. Application Data (60) Provisional application No. 61/873,745, filed on Sep. 4, 2013.

(51) Int. Cl.
H04N 5/222 (2006.01)
H04N 5/225 (2006.01)
H04M 1/02 (2006.01)

(52) U.S. Cl.
CPC ............. *H04N 5/2254* (2013.01); *H04M 1/026* (2013.01); *H04M 1/0264* (2013.01); *H04N 5/2251* (2013.01); *H04N 5/2252* (2013.01); *H04N 5/2257* (2013.01)

(58) Field of Classification Search
CPC . H04N 5/2254; H04N 5/2251; H04N 5/2257; H04N 5/2252; H04M 1/026; H04M 1/0264
USPC .................................... 348/373–375
See application file for complete search history.

(56) References Cited

U.S. PATENT DOCUMENTS

2002/0075398 A1* 6/2002 Milam et al. ................ 348/374
2008/0192124 A1* 8/2008 Nagasaki ................ 348/208.11

* cited by examiner

*Primary Examiner* — Yogesh Aggarwal
(74) *Attorney, Agent, or Firm* — Downey Brand LLP (57) ABSTRACT

This application relates primarily to various apparatus and method for securing and protecting a camera module within a device housing. The securing and protecting elements are configured to take up minimal space within the device housing so that available space for the camera module is maximized. In some embodiments the securing elements can also include grounding features.

20 Claims, 11 Drawing Sheets

CAMERA RELATED FEATURES OF A MOBILE PHONE OR COMPUTING DEVICE

CROSS-REFERENCE TO RELATED APPLICATION(S)

This application claims the benefit of priority under 35 U.S.C §119(e) to U.S. Provisional Application No. 61/873, 745, filed on Sep. 4, 2013, the disclosure of which is incorporated herein by reference in its entirety.

FIELD

The described embodiments relate generally to methods and apparatuses for mounting a camera module within an electronic device. In particular various grounding and shock mounting apparatuses are described.

BACKGROUND

As electronic devices continue to include increasingly greater numbers of features, integration of those features into a single device becomes increasingly complex. One particular feature that has become ubiquitous in popular portable electronic devices is imaging operations enabled by camera modules. Because camera modules include fragile elements such as lens elements and electronics, proper mounting of these modules is important to protect them from damage. Furthermore, improper alignment of the camera module within an electronic device can result in unexpected or even degraded imaging performance. Unfortunately, achieving robust shock mounting and reliable camera alignment can be problematic, especially in situations where those shock mounting and alignment features need to fit in highly constrained spaces.

SUMMARY

This paper describes various embodiments that relate to securing and protecting a camera module within a device housing.

In one aspect, a camera module securing assembly for securing a camera module within a device housing is described. The camera module securing assembly includes a camera retention strap and a cowling. The camera retention strap has a first end and a second end; the first end and the second end are disposed on opposite sides of the camera retention strap. The first end attaches to the device housing. The camera retention strap is designed to secure the camera module within the device housing and limit the camera module from movement. The cowling includes a fastener and a retention arm. The fastener secures the cowling to an internal surface of the device housing. Once the second end of the camera retention strap engages the retention arm, the camera retention strap secures the camera module within the device housing.

In another aspect, a protective assembly providing protection against an external force to a front surface of a camera module in a portable electronic device is described. The protective assembly includes an elastomeric shock mount, an elastomeric camera retention strap, and a metal trim ring. The elastomeric shock mount is coupled to the front surface of the camera module. The elastomeric retention strap extends across a back surface of the camera module. The metal trim ring includes several alignment pins. Each alignment pin passes through one of several openings in the elastomeric shock mount. Each alignment pin engages an opening on the front surface of the camera module. To prevent the camera from breaking and/or misalignment, the elastomeric camera retention strap and elastomeric shock mount dissipate external forces acting on the camera module.

In another aspect, a method for securing a camera module in an electronic device housing is described. A cowling is fastened within the electronic device housing. The cowling has a first retention arm. A camera retention strap is provided; the camera retention strap has a first end and a second end. The first end and the second end are disposed on opposite sides of the camera retention strap. The first end of the camera retention strap is inserted into a recess within the electronic device housing. The camera module is installed in the electronic device housing between the cowling and the first end of the camera retention strap. Once installed, the camera module continuously engaged with a portion of the cowling. Finally, the second end of the camera retention strap engages the first retention arm, and the camera module is secured.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments may be better understood by reference to the following description and the accompanying drawings. Additionally, advantages of the described embodiments may be better understood by reference to the following description and accompanying drawings in which.

DETAILED DESCRIPTION

Representative applications of methods and apparatuses according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Camera modules can be secured within a device housing in a number of ways. In some embodiments the camera module is held between opposing interior surfaces of a device housing. Unfortunately, such a configuration can be problematic as prior to closing the device housing the camera module can move or shift out of alignment within the system. One solution to this problem is to include shock-absorbing elements at front and rear portions of the camera module. Unfortunately, shock mounts tend to take away from space available within the device housing, thereby limiting a size of a camera module that can fit within that constrained space. Since larger camera modules generally yield superior imaging results, this can be highly problematic. One solution is to design the shock absorbing elements to within unused space in the device housing. For example, many camera modules include a protruding front lens element. By placing an elastomeric layer around a peripheral portion of the protruding front lens element, the front portion of the camera module can be cushioned without sacrificing space that could be used to enlarge the camera module.

One solution to adding a rear shock mounting to the camera module without adversely affecting available space in the device housing is to add an elastomeric camera retention strap that fits around a rear surface of the camera module. The elastomeric camera retention strap can have a thickness of about 150 microns, and thereby take away minimal space otherwise useful for containing the camera module. In this way, both sides of the camera module can be protected from impact events.

In addition to providing robust shock mounting, the shock mounting system can further be utilized to electrically ground the camera module. In one embodiment, the camera retention strap can include a layer having a matrix of conductive fibers that can form an electrically conductive grounding path between the camera module and an attachment point of the camera retention strap. Alternatively, on installation of camera module within the device housing, the camera module can be put into contact with grounding springs that provide the electrically conductive pathway. In some embodiments the grounding springs can be an element of a multi-purpose light emitting diode (LED) cowling that is also operative to retain one end of the camera retention strap. Multi-purpose LED cowling can also be operative to provide an electrically conductive grounding path to a main logic board and an antenna component.

In another embodiment, space within the device housing can be more fully utilized by sculpting a portion of the camera module. For example, a protruding portion of a camera module often is cylindrical in nature; however, portions of the cylindrical housing are frequently made of a solid material that contains no functional components. When these solid portions reduce clearance space between the camera module and a portion of the device housing, the solid portions can be removed, leaving an outer surface that more precisely matches features of the device housing. In this way, a camera module that would not normally fit in a given space can be utilized. In yet another embodiment, space within the device housing can be created by removing a trim ring commonly associated with the camera module. Instead of using a traditional trim ring that supports a camera lens cover, a composite patch can be utilized that overlays a substantial portion of a back surface of the device housing. In this way an amount of space can be saved that would otherwise be occupied by the trim ring.

These and other embodiments are discussed below with reference to FIGS. 1-8; however, those skilled in the art will readily appreciate that the detailed description given herein with respect to these figures is for explanatory purposes only and should not be construed as limiting.

Figure 1A:
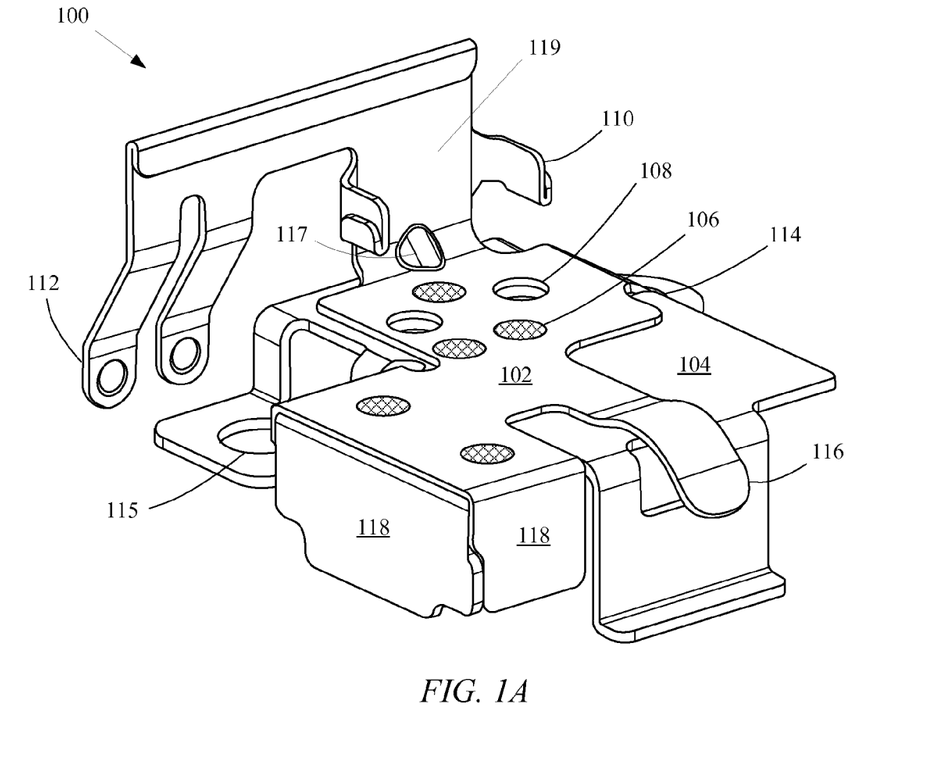
FIG. 1A shows a perspective view of a multi-purpose light emitting diode (LED) cowling.

FIG. 1A shows a perspective view of a multi-purpose light emitting diode (LED) cowling 100 primarily configured to secure an LED (not depicted) and a microphone module (not depicted) within an electronic device housing. Multi-purpose LED cowling 100 includes two structural members 102 and 104 that can be welded together at weld points 106. In some embodiments structural members 102 and 104 can be formed from stainless steel. Fiducials 108 can assist in alignment of structural members 102 and 104 prior to welding the two members together at weld points 106. Structural member 102 as depicted includes retention arms 110 designed to secure one end of a camera retention strap (see FIG. 1B). Structural member 102 can also include grounding springs 112. Grounding springs 112 can be operative to contact a portion of the camera module such that multi-purpose LED cowling 100 can be operative as a grounding pathway for the camera module. An electrically conductive pathway can begin at grounding springs 112, run through structural member 102, pass into structural member 104 and finally continue to chassis ground through a fastener (not depicted) that secures multi-purpose LED cowling 100 to an internal surface of the electronic device housing through fastener opening 114. In this way, a camera module (shown later) grounded through grounding springs 112 can be electrically isolated from a proximate antenna component. The proximate antenna component can also be grounded through multi-purpose LED cowling 100 by way of fastener opening 115.

Structural member 102 can also include main logic board (MLB) grounding spring 116. MLB grounding spring 116 can be configured to deform and be electrically coupled to edge plating on an MLB of the electronic device once the MLB is installed. In this way multi-purpose LED cowling 100 can be operative as a ground for the camera module, an antenna component and the MLB. Structural member 102 can further include light shielding reflectors 118. Light shielding reflectors 118 can be operative to prevent light from an LED disposed within multi-purpose LED cowling 100 from escaping into the device. In this way, additional light that would otherwise be wasted can be redirected out an opening associated with the LED thereby increasing light output and efficiency of the LED.

Multi-purpose LED cowling 100 may further include rib 117. As shown in FIG. 1A, rib 117 engages structural member 102 and vertical member 119 to ensure a perpendicular relationship between structural member and vertical member 119.

Figure 1B:
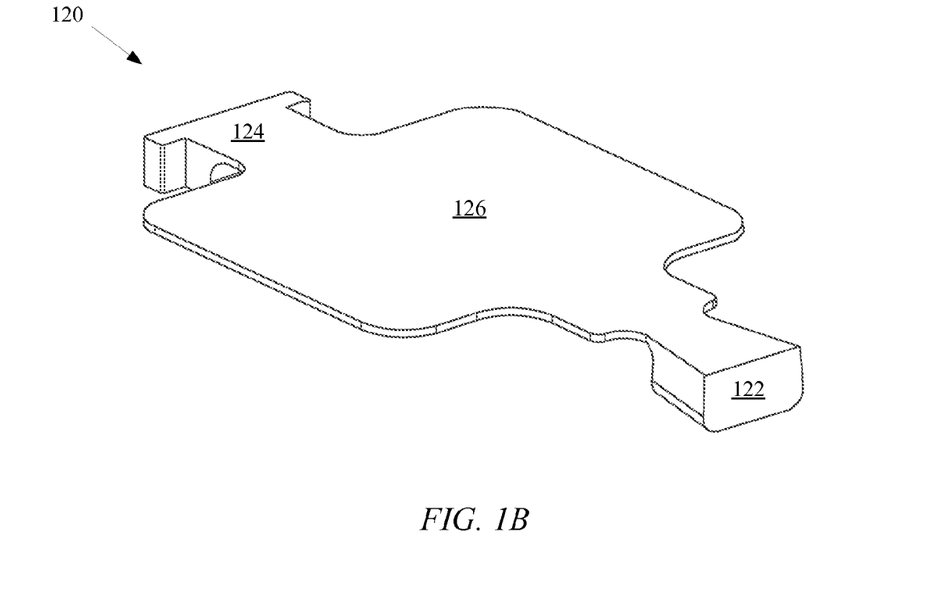
FIG. 1B shows a perspective view of a camera retention strap.

FIG. 1B shows camera retention strap 120. In some embodiments, camera retention strap 120 can be made from an elastomeric material. The elastomeric material can provide cushioning that can help protect a rear portion of a camera module to which it is secured in the event an electronic device within which the camera module is disposed is dropped. Camera retention strap 120 includes retention features 122 and 124 that have geometry allowing them to be coupled to various mating features included in an electronic device. In particular, retention feature 122 is configured to mate with retention arms 110 of multi-purpose LED cowling 100, while retention feature 124 can have a dovetailed geometry configured to match a mating feature disposed within the electronic device housing. In some embodiments, retention features 122 and 124 do not need to be adhesively coupled to secure a camera module, thereby simplifying removal of camera retention strap 120. Camera retention strap 120 can further include central region 126 having a shape and size in accordance with a back surface of a camera module. In this way, any retaining force applied by camera retention strap 120 can be evenly spread across the back surface of the camera module. In some embodiments, central region 126 can be contoured to avoid putting pressure on particularly sensitive or fragile regions of the camera module. Still, in still other embodiments, an opening can be placed in central region 126 to relieve pressure on a targeted area. In yet other embodiments, central region 126 can include a grid region or waffle pattern to reduce an amount of material of camera retention strap 120. In one specific embodiment, central region 126 of camera retention strap 120 can have a thickness of about 150 microns.

Figure 2A:
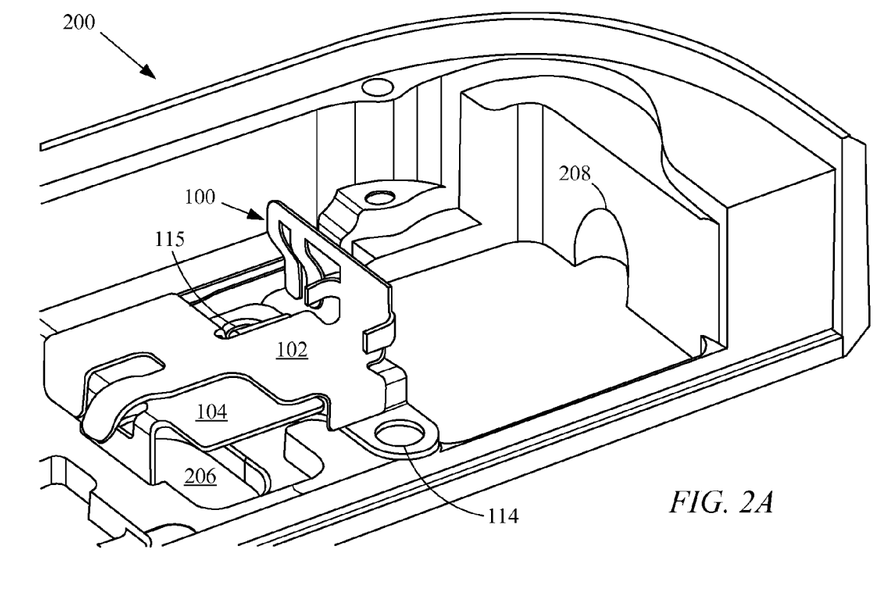
FIG. 2A shows a perspective view of a top portion of a housing having a multi-purpose LED cowling.

FIGS. 2A-2D show a number of views representative of a process for installing camera retention strap 120 around a camera module. FIG. 2A shows a perspective view of an interior portion of an electronic device housing 200. As depicted, multi-purpose LED cowling 100 can be preinstalled within housing 200. Multi-purpose LED cowling 100 can be attached to housing 200 at fastener openings 114 and 115. Although not depicted, an LED module can be disposed within multi-purpose LED cowling 100 such that it can emit light through opening 206. Housing 200 can also include a mating feature 208 configured to retain a retaining feature of camera retention strap 120.

Figure 2B:
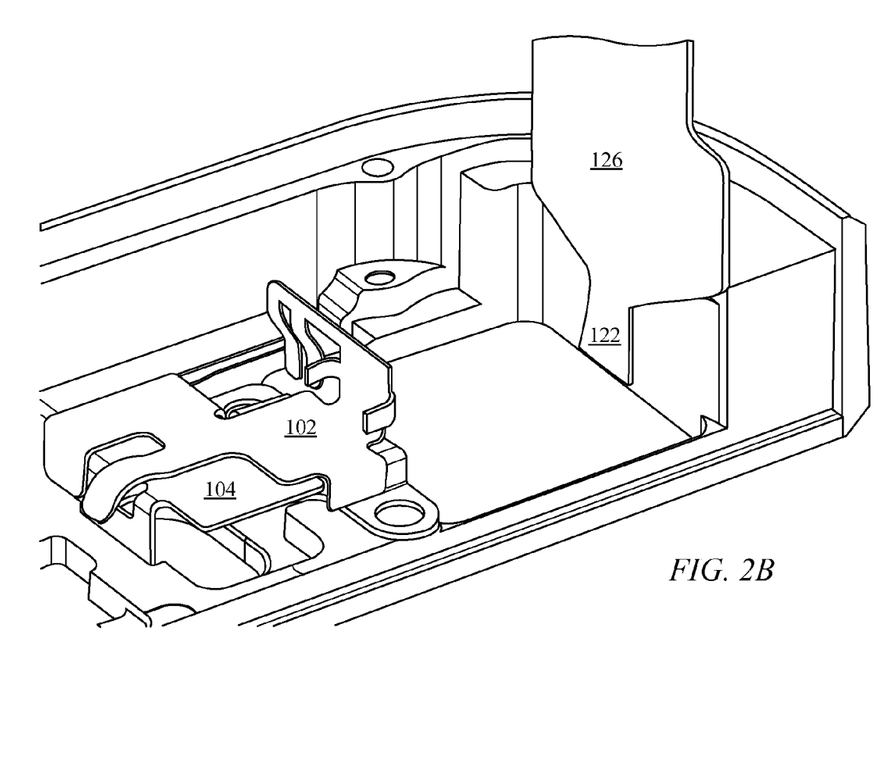
FIG. 2B shows a perspective view of the housing of FIG. 2A further including a camera retention strap having a first end engaged with the housing.
Figure 2C:
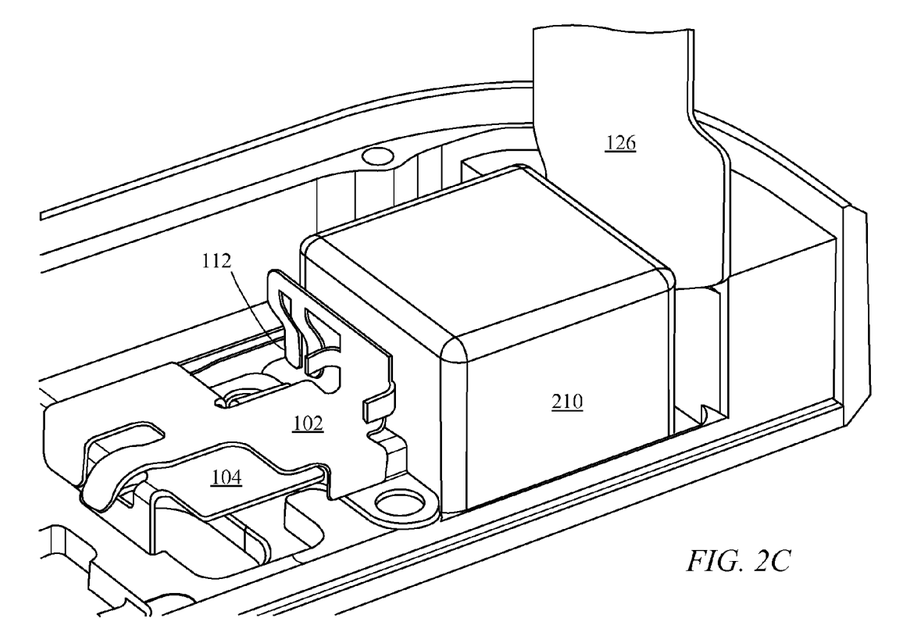
FIG. 2C shows a perspective view of the housing of FIG. 2B further including an installed camera module disposed between the multi-purpose LED cowling and the camera retention strap.
Figure 2D:
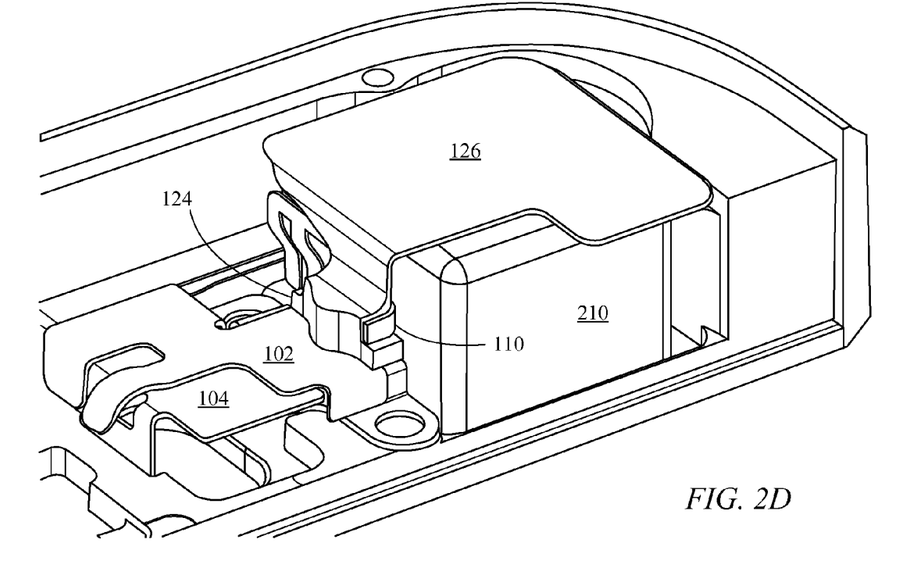
FIG. 2D shows a perspective view of the housing of FIG. 2C further illustrating how a second end of the camera strap can be coupled with the multi-purpose LED cowling.

FIG. 2B shows camera retention strap 120 partially coupled with housing 200. Retention feature 122 is shown inserted within mating feature 208. The dovetailed geometry of retention feature 122 can allow retention feature 122 to be captured within mating feature 208. FIG. 2C shows camera module 210 installed within housing 200. In this position, retention feature 122 of camera retention strap 120 can be secured between mating feature 208 and camera module 210. As camera module 210 is inserted within housing 200, camera module 210 is also electrically grounded to housing 200 by grounding springs 112 of multi-purpose LED cowling 100. Grounding springs 112 can be slightly deformed as camera module 210 exerts pressure against them, so that grounding springs 112 are firmly pressed against camera module 210. FIG. 2D shows a final assembly step in which retention feature 124 of camera retention strap 120 secured to retention arms 110 of multi-purpose LED cowling 100. In this way, central portion 126 of camera retention strap 120 can evenly distribute a force against a back surface of camera module 210. An amount of force exerted upon camera module 210 can be directly related to a length of camera retention strap 120. In this way, a precise amount of force can be applied to camera module 210 by properly sizing a length dimension of camera retention strap 120. It should also be noted that a thickness of central portion 126 of camera retention strap 120 can be varied to provide a degree of shock mounting for camera module 210. In some embodiments, central portion 126 can be pushed directly against another structural element such as a layer of cover glass.

Figure 3A:
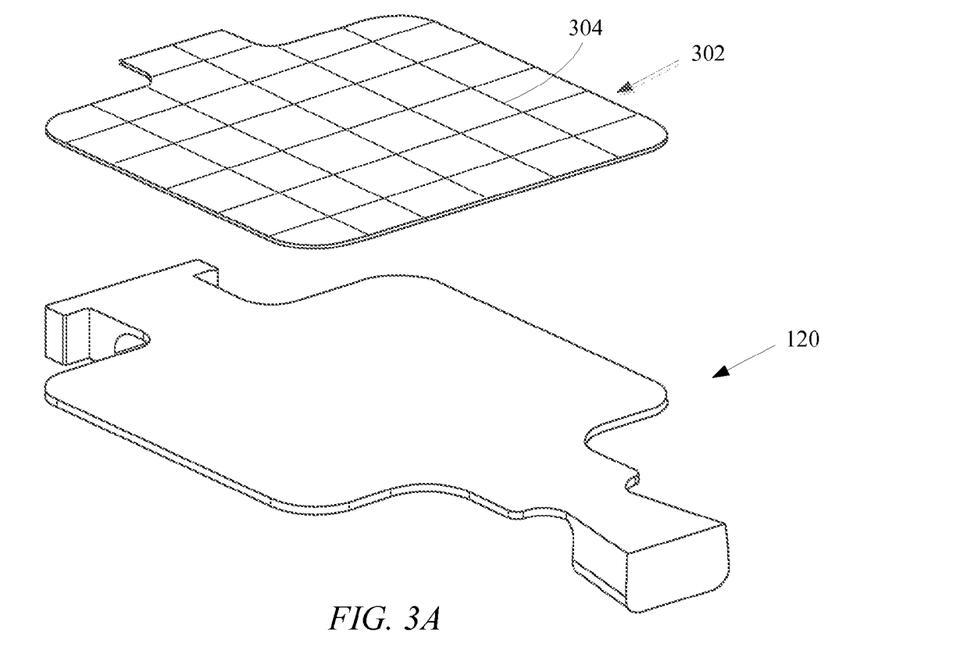
FIGS. 3A-3B show perspective views of a camera retention strap including a layer of conductive rip-stop.
Figure 3B:
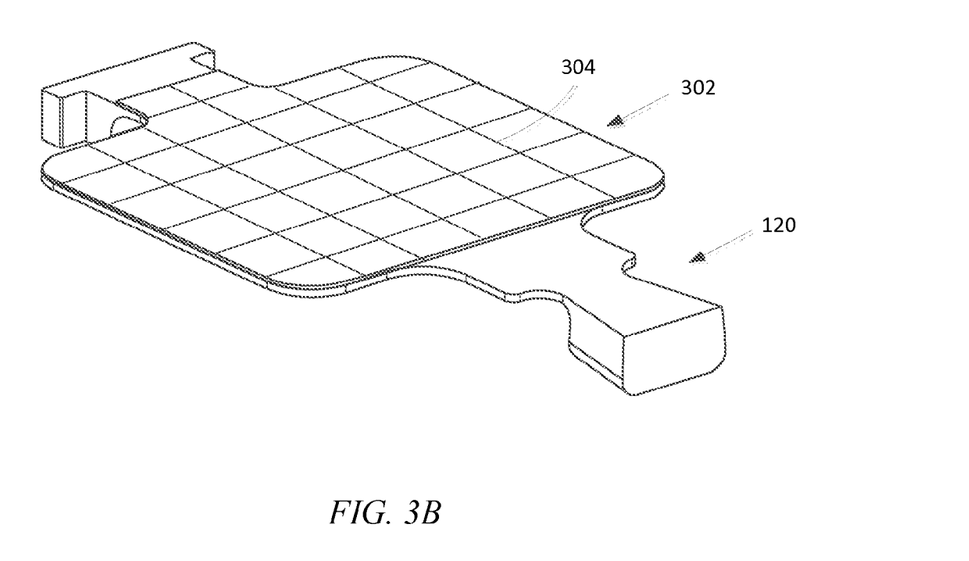

FIG. 3A shows an alternative camera retention strap embodiment. In this embodiment a layer of rip-stop material can be coupled to camera retention strap 120. In one particular embodiment, the rip-stop material can be laminated to camera retention strap 120. FIG. 3A shows rip-stop layer 302 positioned above camera retention strap 120, while FIG. 3B shows rip-stop layer 302 subsequent to lamination of rip-stop layer 302 against camera retention strap 120. In another embodiment, rip-stop layer 302 can also be adhesively coupled to camera retention strap 120 by a layer of adhesive affixed to a bottom surface of rip-stop layer 302. Rip-stop layer 302 can prevent tears from forming and propagating along an elastomeric camera retention strap 120. Rip-stop layer 302 includes a number of fibers 304 (see grid depicted in FIGS. 3A and 3B) that can further halt progression of rips in elastomeric camera retention strap 120. In certain cases, rip-stop layer 302 can prevent ripping of camera retention strap 120 during installation. In some embodiments, fibers 304 embedded within rip-stop layer 302 can be conductive fibers 304. Conductive fibers 304 can be used to conduct current to ground across a surface of rip-stop layer 302. It should be noted that because rip-stop layer 302 is substantially rigid it can prevent uneven stretching of camera retention strap 120. In this way, camera retention strap 120 can have a consistent thickness that allows it to provide protection for a camera module in vulnerable areas of the camera module. It should also be noted that by shaping rip-stop layer 302 in particular portions, camera retention strap 120 overlaid by rip-stop layer 302 can be prevented from stretching. While a substantially conformal rip-stop layer 302 is depicted in FIGS. 3A-3B this shape could be adjusted when testing indicates certain areas need more or less strengthening or support.

Figure 3C:
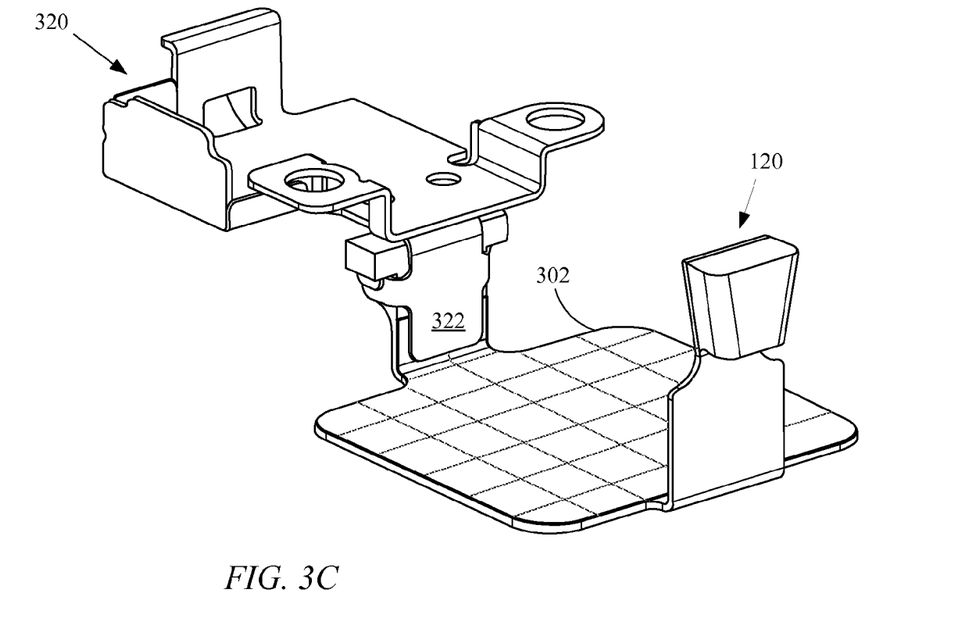
FIGS. 3C-3D show perspective views of the camera retention strap of FIGS. 3A-3B coupled with a multi-purpose LED cowling.
Figure 3D:
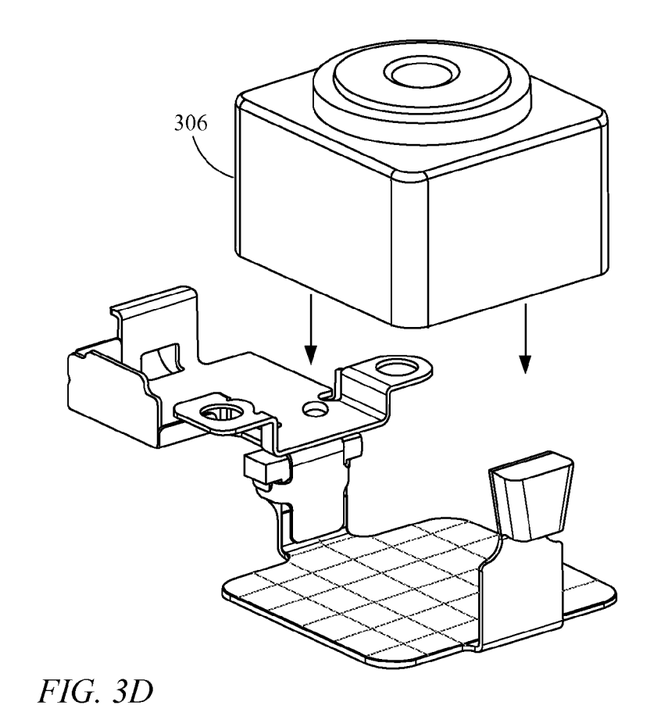

FIG. 3C shows a perspective view of camera retention strap 120 coupled with a multi-purpose LED cowling 320. It should be noted that multi-purpose LED cowling 320 is slightly different than multi-purpose LED cowling 100 (shown in FIG. 1A) in that it does not include grounding springs 112. Instead of using grounding springs, multi-purpose LED cowling 320 utilizes conductive rip-stop layer 302 to electrically couple camera module 306 (see FIG. 3D) with multi-purpose LED cowling 320. When camera retention strap 120 is in direct contact with camera module 306, conductive fibers 304 can provide an electrically conductive grounding path to mating feature 322 of multi-purpose LED cowling 320. Such a configuration can be advantageous as a configuration without grounding springs is simpler to manufacture and there is no risk of grounding springs being bent or deformed during a drop event. Furthermore, as discussed above, rip-stop layer 302 provides a more robust camera retention strap 120 that is less likely to tear and/or fail during use.

Figure 4A:
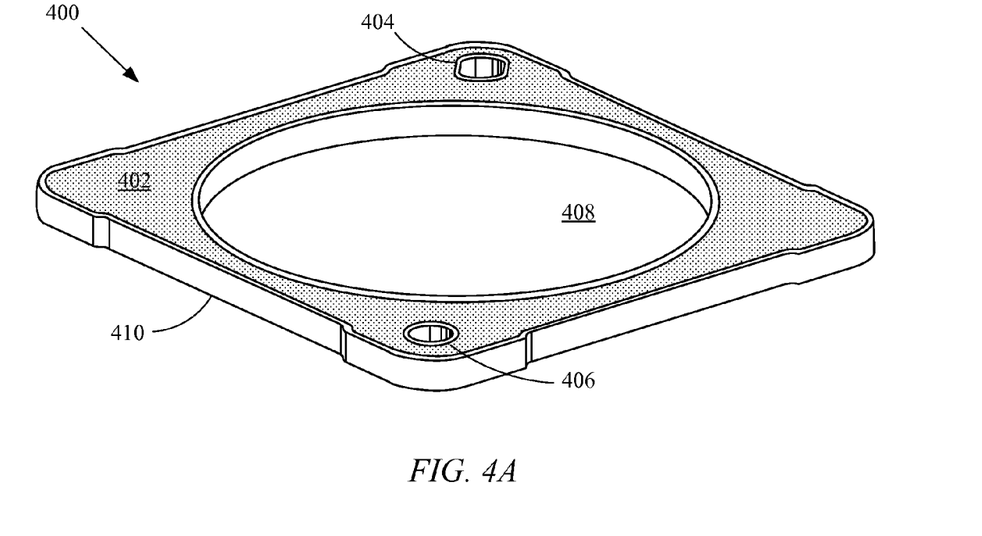
FIGS. 4A-4B show perspective views of various embodiments configured to provide a shock mounting for a front surface of a camera module.
Figure 4B:
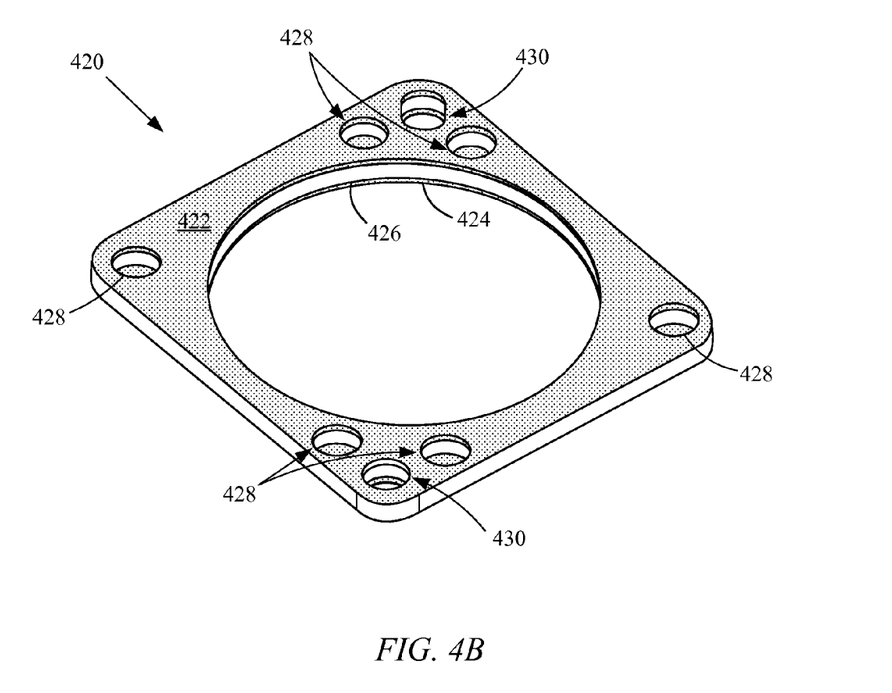

FIGS. 4A-4B shows various embodiments of a shock mount for a front surface of a camera module. FIG. 4A shows that shock mount 400 is a primarily elastomeric part having a metal plate 402 disposed across a top surface of the part. Metal plate 402 is integrated along a top surface such that metal plate 402 provides reinforcement for alignment pin openings 404 and 406. Metal plate 402 is also operable to provide reinforcement for opening 408 through which a front protruding lens portion of a camera module is configured to pass. Elastomeric layer 410 is arranged around openings 404 and 406 and provides an amount of shock protection in case of shearing stresses. This shearing protection can prevent alignment pins (not depicted) from breaking off during a drop event. In the case of opening 408, the shearing protection can reduce an amount of shock transmitted to front lens elements of an associated camera module. A distance between metal plate 402 and the various openings in shock mount 400 can be adjusted to provide additional cushioning by enlarging the distance, or provide improved alignment by reducing the distance. Furthermore, a thickness of elastomeric layer 410 can dissipate shocks applied along a plane normal to a top surface of the shock mounting. In this way, shock mount 400 can provide shock mounting in all three axes.

FIG. 4B shows an alternative embodiment of shock mount 420 for the front surface of a camera module. Shock mount 420 includes rigid top plate 422, rigid bottom plate 424, and elastomeric layer 426 sandwiched between rigid top plate 422 and rigid bottom plate 424. In this way, shock mount 420 can provide reduced shock to an axis normal to a top surface of shock mount 420. Shock mount 420 can be welded to a top surface of a camera module. Openings 428 provide access to bottom plate 424 through elastomeric layer 426, thereby allowing a welding operation to weld bottom plate 424 to a top surface of a camera module, while openings 430 pass entirely through shock mount 420. Openings 430 can serve multiple purposes. For example, openings 430 can act as fiducials for aligning shock mount 420 with a camera module prior to a welding operation. Additionally, openings 430 can allow alignment pins to pass through shock mount 420. Shock mount 420 can also provide precise alignment of alignment pins with a camera module since the alignment pins can be in direct contact with rigid top plate 422.

Figure 4C:
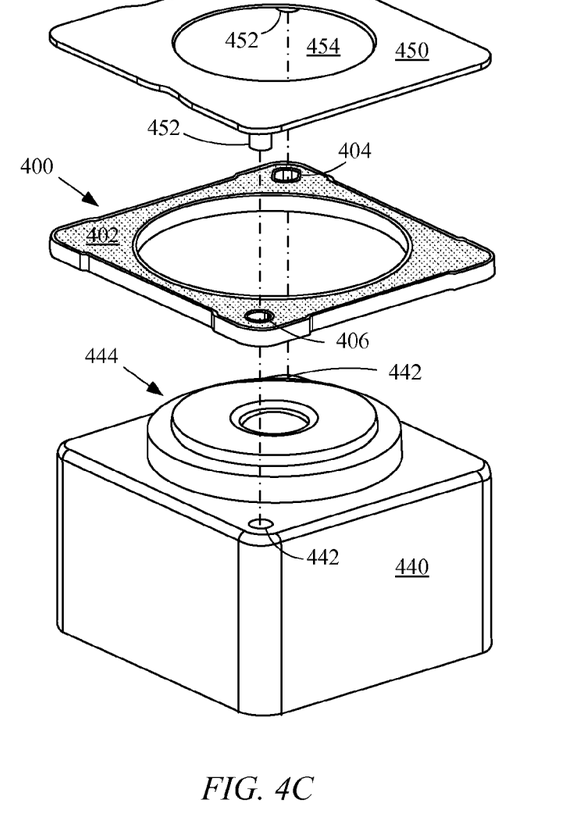
FIGS. 4C-4D show perspective and cross-sectional views of a camera assembly, the shock mount depicted in FIG. 4A, and a metal trim component.

FIG. 4C shows how shock mount 400 of FIG. 4A can be assembled with camera module 440 having a top protruding portion 444 and metal trim component 450 having an opening 454. Metal trim component 450 includes metal alignment pins 452 configured to pass through shock mount 400 and extend at least partially into openings 442 of camera module 440. When shock mount 400 is securely coupled with camera module 440, metal alignment pins 452 do not have to extend substantially into openings 442 and in the event of substantial compression, alignment pins 452 can be driven into openings 442 without impacting camera module 440. Furthermore, in some embodiments, alignment pins 452 shorter pins may have a length of approximately 0.7 mm. Such a length may lead to a lower likelihood of shearing off during a drop event.

Figure 4D:
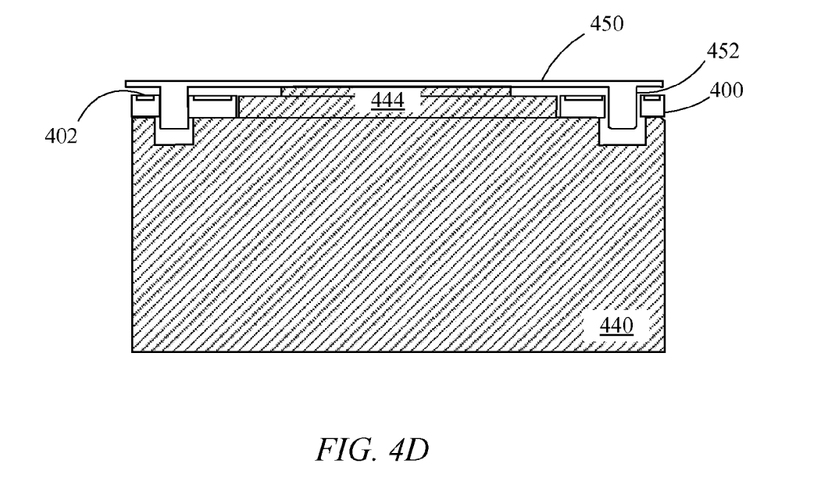

Assembly of the parts can be accomplished by a pick and place, which can result in high precision alignment of each of the parts. High precision alignment of the parts can reduce an amount of tolerance between the parts, thereby reducing an amount of clearance for required for the parts. Furthermore, tight tolerances of the various parts decrease sample variation and can reduce alignment errors in the camera module. Shock mount 400 can be adhesively coupled or welded to a top surface of camera module 440. FIG. 4D shows a cross-sectional side view in which shock mount 400 is assembled together with camera module 440 and metal trim component 450. This view illustrates how elastomeric portions of shock mount 400 can be utilized to reduce shearing forces on alignment pins 452 and a top protruding portion 444 of camera module 440. It should be noted that in some embodiments, the opening for the trim component 450 does not come into contact with top protruding portion 444 of camera module 440. It should also be noted that metal trim component 450 can be secured proximate to an opening in a device housing, so that it can provide support for a lens cover configured to allow light to enter the device housing and camera module 440.

Figure 5A:
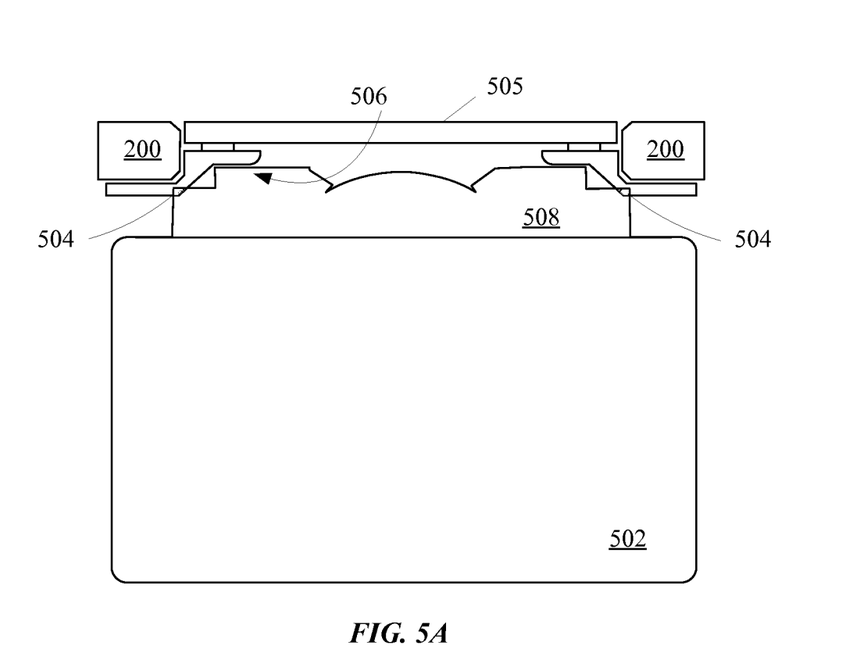
FIGS. 5A-5B show how a camera can be sculpted to have a size and shape in accordance with other components of a device enclosure.
Figure 5B:
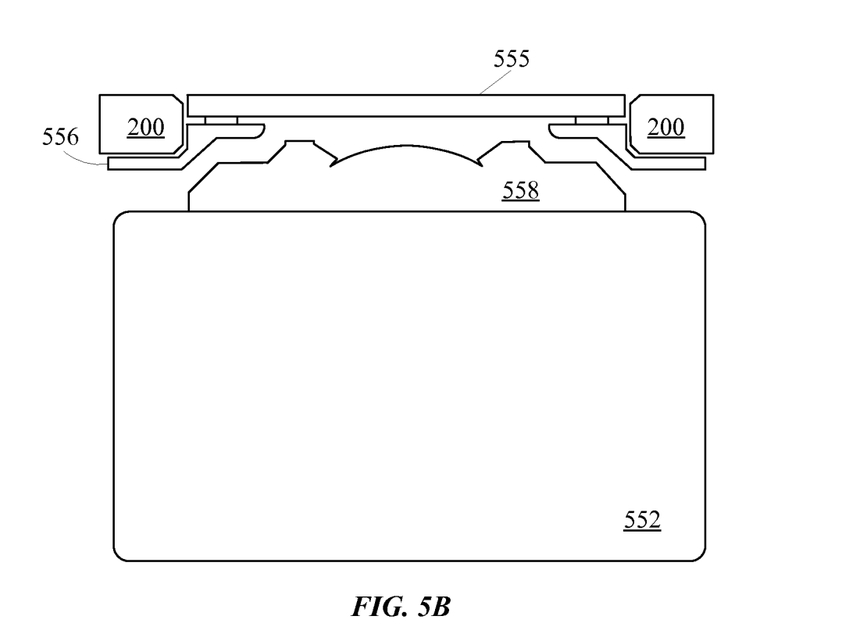

FIGS. 5A-5B show a method of sculpting a protruding lens portion of a camera module to create increased vertical space for a camera module. Camera module manufacturers often create a cylindrical protruding lens region 508 larger than needed given positioning of interior elements within camera module 502. For example, FIG. 5A shows how using a relatively taller camera module in place of a shorter camera module can be problematic. Here, camera trim 505 includes an engaging portion 506 configured to engage a (relatively taller) protruding lens region 508 of camera module 502. The region denoted as 504 is an overlapping region. In order to maintain the existing spatial relationship between camera trim 505 and camera module 502, engaging portion 506 would need to overlap portions of protruding lens region 508 in the overlapping region 504. Because these structures—engaging region 506 and protruding lens region 508—cannot overlap, it is clear that protruding lens region 508 is too tall to fit in this constrained space, and there may be insufficient room for enclosure housing.

However, when a protruding lens region of a camera module is made of plastic or some other malleable material, it can be sculpted, or shaped, to have a similar profile as that of engaging portion of the camera trim, thereby allowing a camera module to conform to restricted dimensions associated with an electronic device. FIG. 5B shows protruding lens region 558 being reshaped to create additional space within enclosure housing 200 to eliminate an overlapping region. In this way camera module 552 can have sufficient standoff from camera trim 555 trim ring 556 so that in the event of a drop event, camera module 552 can shift slightly forward without striking camera trim 555. Further, the restricted dimensions of enclosure housing 200 can accommodate camera module 552 with a relatively taller protruding lens region 558.

Figure 6:
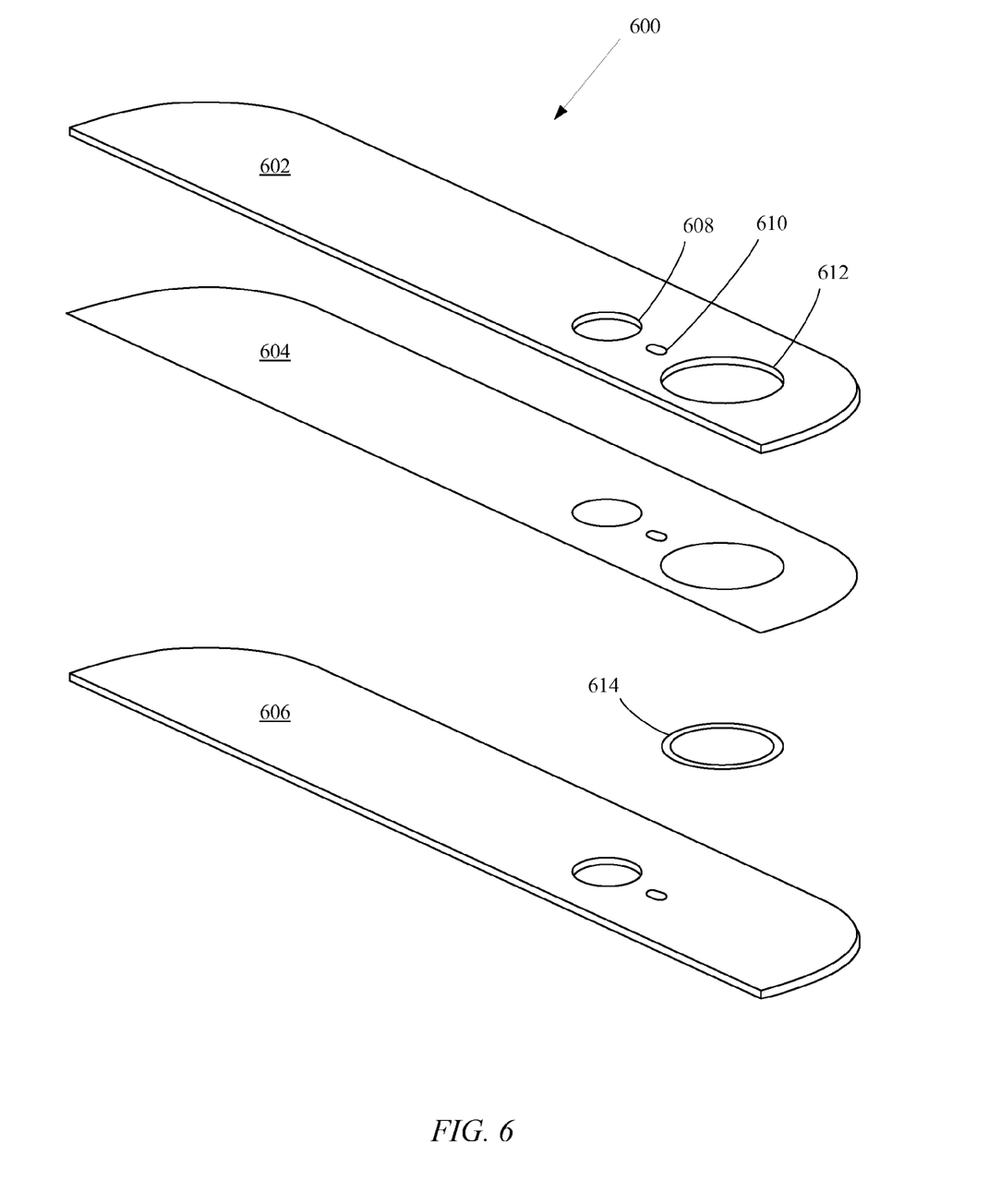
FIG. 6 shows a low-profile composite patch that can be used to form a window through which a camera module can take images.

FIG. 6 shows a composite antenna patch 600 that eliminates a distinct trim ring as depicted in FIGS. 5A and 5B. Composite antenna patch 600 can be radio frequency (RF) neutral so that wireless data can pass into and out of a device through composite antenna patch 600. Radio frequency neutral material can include, for example, plastic and glass material. Composite antenna patch 600 can include a number of layers including interior patch 602, adhesive layer 604 and outer patch 606. Adhesive layer 604 can be used to bind inner patch 602 to outer patch 606. In one particular embodiment, inner patch 602 can be approximately 0.3 mm thick and outer patch 606 can be approximately 0.5 mm thick. In other embodiments, each layer can include both LED opening 608 and microphone opening 610. LED opening 608 can be useful for aligning an LED with a portion of composite antenna patch 600. In some embodiments, an LED can be disposed entirely through each of layers 602, 604, and 606 interior patch 602, adhesive layer 604, and outer patch 606 so that a light-emitting surface of the LED is flush with an outer surface of outer patch 606. In other embodiments, the LED can be recessed back from the outer surface of outer patch 606. Inner patch 602 can also include camera opening 612. Camera opening 612 can be utilized to provide alignment between a camera module and inner patch 602. Instead of utilizing a trim ring to support a lens cover, a solid outer patch 606 can be disposed across camera opening 612. In some embodiments, outer patch 606 can be a glass layer so as not to adversely impact light passing through outer patch 606 and into an underlying camera module. Because a trim ring can take up more than 0.5 mm of space within an enclosure, the omission of a trim ring can increase clearance within an enclosure, thereby allowing for larger camera modules having improved image quality over smaller modules. It should be noted that in some embodiments a separate cosmetic trim ring 614 can be aligned with adhesive layer 604 to provide an outward appearance of a more traditional trim ring. Because cosmetic trim ring 614 is primarily cosmetic in purpose, it can have a thickness that does not exceed a thickness of the adhesive layer.

Figure 7A:
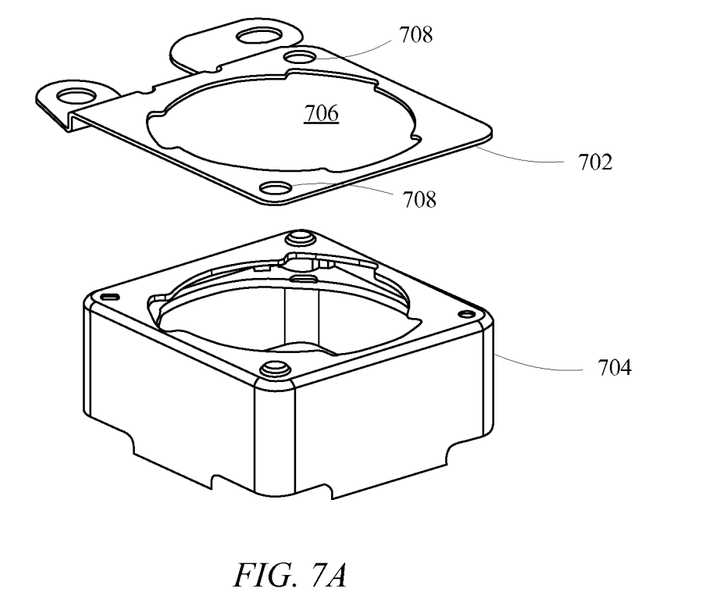
FIGS. 7A and 7B show perspective views of an alternative camera grounding and alignment apparatus.
Figure 7B:
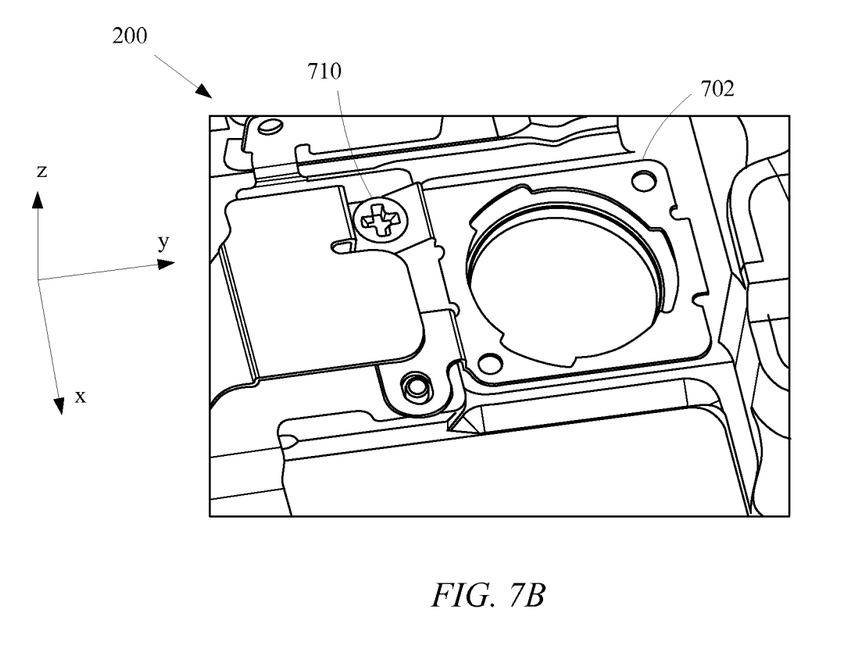

FIG. 7A shows an alternative camera grounding and alignment bracket. Top cover 704 (for a camera module) can provide a substrate upon which an alignment bracket 702 can be mounted. Alignment bracket 702 can include an opening 706 through which top cover 704 can receive light. Furthermore, alignment bracket 702 can include threaded openings 708, or in some cases just smooth openings 708, for aligning and/or securing top cover 704 to alignment bracket 702. Top cover 704 can be secured to alignment bracket 702 in many ways including, for example, by an adhesive or by welding the two components together. Because alignment bracket 702 is formed from a metal material, it provides rigid X-Y alignment for top cover 704. Alignment bracket 702 can be mechanically coupled directly to housing 200 by at least fastener 710, as depicted in FIG. 7B. In this way, when top cover 704 engages bracket 702, the camera module is properly aligned with housing 200 and grounded to chassis ground through alignment bracket 702.

Figure 8:
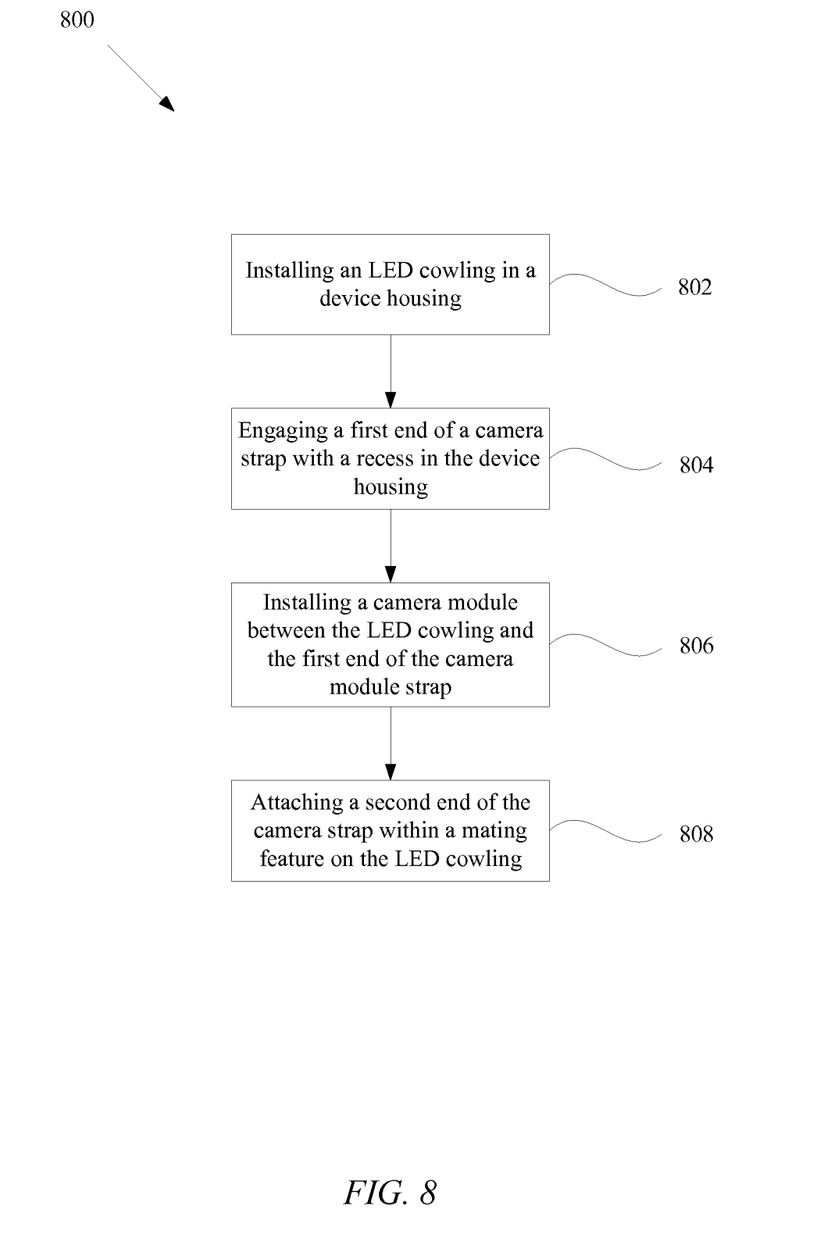
FIG. 8 shows a block diagram illustrating a method by which a camera module can be installed within an enclosure.

FIG. 8 shows a block diagram illustrating a method 800 by which a camera module can be installed within an enclosure. In a first step 802, a multi-purpose LED cowling is installed within a device housing. At step 804, a first end of a camera retention strap is engaged with a recess in the device housing proximate to the installed multi-purpose LED. At step 806, a camera module is placed between the multi-purpose LED cowling and the first end of the camera retention strap. By placing the camera module in this position a first side of the camera module is electrically coupled to grounding pins extending from the multi-purpose LED cowling, while a second side of the camera module opposite the first side pushes against a retention feature of the first end of the camera retention strap such that the first end is secured within the recess in the device housing. At step 808, the camera retention strap is stretched across a back surface of the camera module, and a second end of the camera retention strap is engaged with a mating feature of the multi-purpose LED cowling.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

The invention claimed is:

1. A camera module securing assembly for securing a camera module within a device housing, the camera module securing assembly comprising:
   a camera retention strap having a first end and a second end, the second end opposite the first end that attaches to the device housing;
   wherein the camera retention strap limits movement of the camera module and provides a cushioning against an external force; and
   a cowling comprising:
      a fastener that secures the cowling to an internal surface of the device housing; and
      a retention arm that receives the second end of the camera retention strap and secures the camera module.

2. The camera module securing assembly as recited in claim 1, further comprising:
   a shock mount configured to be coupled with a front surface of the camera module, the shock mount having a first aperture and a second aperture.

3. The camera module securing assembly as recited in claim 2, wherein the camera retention strap and the shock mount are made of an elastomeric material, and wherein the fastener of the cowling electrically grounds the cowling.

4. The camera module securing assembly as recited in claim 2, the shock mount further comprising a metal plate on a top surface of the shock mount, wherein the metal plate provides reinforcement to the first aperture and the second aperture.

5. The camera module securing assembly as recited in claim 4, wherein the cowling is a multi-purpose light emitting diode (LED) cowling.

6. The camera module securing assembly as recited in claim 4, further comprising:
   a metal trim component positioned over the shock mount, the metal trim component having a first pin and a second pin; and
   wherein the first pin engages the first aperture of the shock mount and the second pin engages the second aperture of the shock mount.

7. The camera module securing assembly as recited in claim 6, wherein the first pin of the metal trim component engages a first cavity of the camera module, and wherein the second pin of the metal trim component engages a second cavity of the camera module.

8. The camera module securing assembly as recited in claim 1, the camera retentions strap further comprising a of rip-stop coupled to a central portion of the camera retention strap.

9. The camera module securing assembly as recited in claim 8, wherein the rip-stop further comprises a conductive layer having conductive fibers, the conductive fibers operable to provide an electrically conductive grounding path.

10. The camera module securing assembly as recited in claim 1, further comprising a grounding spring, wherein the grounding spring engages the camera module, and wherein the grounding springs provides an electrical ground for camera module.

11. The camera module securing assembly as recited in claim 1, wherein the camera retention strap exerts a retaining force on a back surface of the camera module.

12. The camera module securing assembly as recited in claim 1, the cowling comprising a light shield reflector, the light shield reflector operable to prevent light from escaping the cowling.

13. A protective assembly providing protection against external forces to a front surface of a camera module in a portable electronic device, comprising:
an elastomeric shock mount mechanically coupled to the front surface of the camera module, the front surface including a lens portion;
an elastomeric camera retention strap extending along a back surface of the camera module;
a metal trim ring having a plurality of alignment pins configured to pass through a plurality of openings in the elastomeric shock mount and into openings disposed along the front surface of the camera module; and
wherein the elastomeric camera retention strap and elastomeric shock mount cooperate to dissipate the external forces applied to the camera module.

14. The protective assembly of claim 13, wherein the metal trim ring includes an angled surface, the angled surface of the metal trim ring corresponding to an angled surface of a protruding lens portion positioned between the camera module and the metal trim ring.

15. The protective assembly of claim 14, wherein the elastomeric shock mount provides protection from a drop event in a first dimension, a second dimension, and a third dimension.

16. The protective assembly of claim 13, wherein the elastomeric shock mount includes a metal plate disposed on a top surface of the elastomeric shock mount, the metal plate configured to provide reinforcement to an opening of the elastomeric shock mount.

17. A method for securing a camera module in an electronic device housing, comprising:
fastening a cowling within the electronic device housing, the cowling having a first retention arm;
providing a camera retention strap having a first end and a second end;
inserting the first end of the camera retention strap into a recess within the electronic device housing;
installing the camera module in the electronic device housing between the cowling and the first end of the camera retention strap, the camera module continuously engaging a portion of the cowling; and
engaging the second end of the camera retention strap with the first retention arm.

18. The method as recited in claim 17, wherein the camera module is electrically coupled to grounding springs of the cowling.

19. The method as recited in claim 17, wherein the camera retention strap includes a conductive layer rip-stop for electrically grounding the cowling.

20. The method as recited in claim 17, wherein the camera retention strap is made of an elastomeric material.

* * * * *